US010587592B2

(12) United States Patent
Koya et al.

(10) Patent No.: US 10,587,592 B2
(45) Date of Patent: Mar. 10, 2020

(54) EFFICIENT CENTRALIZED CREDENTIAL STORAGE FOR REMOTELY MANAGED NETWORKS

(71) Applicant: ServiceNow, Inc., Santa Clara, CA (US)

(72) Inventors: Venkata Kiran Kumar Koya, San Diego, CA (US); Rebecca Dias, Kirkland, WA (US); Vincent Seguin, Encinitas, CA (US); Hardik Modi, San Diego, CA (US); Gopalakrish Venkatachalam, San Diego, CA (US); Jun Zhou, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 379 days.

(21) Appl. No.: 15/587,042

(22) Filed: May 4, 2017

(65) Prior Publication Data
US 2018/0324159 A1 Nov. 8, 2018

(51) Int. Cl.
H04L 29/06 (2006.01)
G06F 21/60 (2013.01)
G06F 21/44 (2013.01)

(52) U.S. Cl.
CPC .......... H04L 63/062 (2013.01); G06F 21/44 (2013.01); G06F 21/602 (2013.01);
(Continued)

(58) Field of Classification Search
CPC combination set(s) only.
See application file for complete search history.

(56) References Cited

U.S. PATENT DOCUMENTS 9,787,655 B2 * 10/2017 Marshall ............... G06F 21/335
2002/0052912 A1 * 5/2002 Griswold .......... H04M 1/72561
709/200

(Continued)

OTHER PUBLICATIONS

ServiceNow, ServiceNow Documentation (Credentials), Mar. 14, 2017 (downloaded from public web site http://docs.servicenow.com).

(Continued)

Primary Examiner — Lynn D Feild
Assistant Examiner — Richard A McCoy
(74) Attorney, Agent, or Firm — Fletcher Yoder PC

(57) ABSTRACT

An example embodiment may involve receiving, by a server device that stores a plurality of access credentials for computing devices that are disposed within a managed network, a request containing a label and an indication of an application service. The server device may be disposed within a remote network management platform that remotely manages the managed network. The example embodiment may further involve mapping, by the server device, the label and the application service to an endpoint identifier of a target computing device that is disposed within the managed network. The endpoint identifier may be associated with particular access credentials that are usable to access the application service executing on the target computing device. The example embodiment may further involve transmitting, by the server device, the endpoint identifier and the particular access credentials.

18 Claims, 10 Drawing Sheets

(52) U.S. Cl.
CPC ........ *H04L 63/0281* (2013.01); *H04L 63/045* (2013.01); *H04L 63/083* (2013.01); *H04L 63/10* (2013.01); *G06F 2221/2115* (2013.01); *G06F 2221/2129* (2013.01)

(56) References Cited

U.S. PATENT DOCUMENTS

| | | | |
|---|---|---|---|
| 2005/0043038 A1* | 2/2005 | Maanoja | G01S 5/0027 455/456.1 |
| 2011/0276961 A1* | 11/2011 | Johansson | G06F 8/61 717/178 |
| 2011/0319056 A1* | 12/2011 | Toy | H04L 9/3226 455/412.2 |
| 2015/0134956 A1* | 5/2015 | Stachura | H04L 63/0807 713/168 |
| 2015/0195138 A1* | 7/2015 | Horman | H04L 41/0893 709/226 |
| 2016/0366134 A1* | 12/2016 | Hughes | H04M 15/00 |
| 2017/0339148 A1* | 11/2017 | Syomichev | H04L 63/10 |

OTHER PUBLICATIONS

Salesforce.com, Named Crednetials, Mar. 14, 2017 (downloaded from public web site https://help.salesforce.com/articleView?id=named_credentials_about_htm&type=0).

* cited by examiner

EFFICIENT CENTRALIZED CREDENTIAL STORAGE FOR REMOTELY MANAGED NETWORKS

BACKGROUND

Remote network management may involve remotely accessing (e.g., logging on to) computing devices on a managed network. Through this process, information about these computing devices may be collected, and the configuration of the computing devices may be modified. But in order to gain access, sets of credentials for these computing devices should be available. These credentials may include userid/password pairs, or other parameters, which permit access to specific services operating on the computing devices. For a network with remotely managed computing devices operating an extent of services, it may be challenging to store credentials in a fashion that enables rapid identification of the proper credentials for a given computing device and service.

SUMMARY

It is now common for enterprise networks to include tens of thousands of computing devices across dozens of networks, supporting thousands of users. These computing devices may include various types of equipment, such as client devices, server devices, routers, storage arrays, and so on. Each of these computing devices may be configured to execute one or more services—typically software applications executing on the respective computing devices that perform specific tasks. Services may also be referred to as "applications" or "application services," and may be performed by application-layer software, kernel software, device driver software, or by hardware.

A computing device, or a computing device and a service executing thereon, may define a logical endpoint that is remotely accessible through the use of the appropriate credentials. For instance, a server device on an enterprise network may support services including a remote administration command-line interface such as secure shell (SSH), a web server application, and a database application. In other embodiments, more or fewer services may be operating per computing device.

Some of these services may be associated with respective uniform resource locators (URLs). By way of these URLs, various users and/or entities may gain access to the respective application services. In order to limit access to the appropriate parties, each service may be associated with a distinct set of credentials, and a party attempting to use the service may have to first authenticate itself by presenting these credentials.

Given the increasing scale of enterprise networks, there is a growing desire to automate at least some of the management and operational aspects of these systems. Thus, a cloud-based remote network management platform may be used to consolidate the control of these tasks. For example, the remote network management platform may store, in a database, configuration and operational information regarding computing devices of the managed network, and may provide a unified web-based interface through which to access this information and control the computing devices. By way of one or more proxy servers disposed within the managed network, the remote network management platform may access these computing devices and the services executing thereon in order to carry out operational, configuration, and/or higher-level tasks. Accordingly, computing devices of the remote network management platform and/or the proxy servers should have access to the necessary credentials.

In the past, these credentials were stored in various applications scattered throughout the managed network. To the extent that any credentials were stored in databases, the credentials used in different services and remote management procedures were spread across various tables of one of more databases. Such an arrangement led to a number of problems, including difficulties ensuring that all credentials are secured (e.g., encrypted), and challenges in finding the table and/or database that held a specific sought-after credential.

Accordingly, an improvement is for all credentials to be disposed within a single, unified credential store, such as a distinct database or one or more specific tables within the configuration databases for the managed network. The credential store may be within the remote network management platform and entries in it may be encrypted. The proxy server in the managed network may request and receive a set of credentials from the credential store, and then use these credentials to access a computing device on the managed network. Thus, credentials for a managed network may be stored in a unified fashion in a database that is outside of the managed network.

In some embodiments, a managed network may use multiple logically separate computing instances (e.g., physical or virtual machines that may also be referred to as "customer instances" or just "instances") within the remote management platform. The high-level applications supported by these instances may be referred to as "orchestrations," and may involve remotely accessing multiple computing devices in the managed network, perhaps in a particular order, to carry out various tasks. For example, an orchestration procedure may involve applying a patch to and then rebooting all computing devices with a particular operating system, or modifying employee records across several different computing systems.

Each of these instances may be dedicated to a different set of operations with respect to the managed network. Therefore, the computing devices and credentials used for particular services may be different between instances. As an example, remote management procedures for a production instance may be configured to remotely access one set of computing devices (e.g., computing devices that are in production use on the managed network), while remote management procedures for a test instance may be configured to remotely access another set of computing devices (e.g., computing devices that are part of a testbed in the managed network). Even if both instances are carrying out the same orchestration (e.g., the test instance is used for testing an orchestration before it is deployed to the production instance), each orchestration would need to use different credentials in order to avoid exposing production credentials to parties just involved in testing.

Thus, another improvement is for credentials to be associated with an endpoint identifier and a label. The endpoint identifier may specify, for example, a network address, range of network addresses, or a URL through which a particular service executing on a particular computing device is reachable. The label may be a string of characters or bits (e.g., an alphanumeric string or a bitstring of a particular length) that is associated with the endpoint identifier and the service. Remote management procedures on both instances may refer to a label and an application service, rather than an endpoint identifier and a service or just a service. Thus, each instance may maps the same label and/or service to a different endpoint identifier and set of credentials. In this way, the values of endpoint identifiers or credentials in software and configuration files for orchestrations need not be modified when these files are transferred between instances. Instead, the values in the credential store are modified.

Accordingly, a first example embodiment may involve a system including a proxy server application executing on a proxy server device that is disposed within a managed network, and a server device that is disposed within a remote network management platform that remotely manages the managed network. The server device may store a plurality of access credentials for computing devices that are disposed within the managed network. The server device may be configured to: receive, from the proxy server application, a request containing a label and an indication of an application service; map the label and the application service to an endpoint identifier of a target computing device that is disposed within the managed network, where the endpoint identifier is associated with particular access credentials of the plurality of access credentials that are usable to access the application service executing on the target computing device; and transmit, to the proxy server application, the endpoint identifier and the particular access credentials, where reception of the endpoint identifier and the particular access credentials causes the proxy server application to remotely access the application service executing on the target computing device.

A second example embodiment may involve receiving, by a server device that stores a plurality of access credentials for computing devices that are disposed within a managed network, a request containing a label and an indication of an application service. The server device may be disposed within a remote network management platform that remotely manages the managed network. The request may be received from a requesting device. The second example embodiment may also involve mapping, by the server device, the label and the application service to an endpoint identifier of a target computing device that is disposed within the managed network. The endpoint identifier may be associated with particular access credentials of the plurality of access credentials that are usable to access the application service executing on the target computing device. The second example embodiment may also involve transmitting, by the server device and to the requesting device, the endpoint identifier and the particular access credentials. Reception of the endpoint identifier and the particular access credentials may cause the requesting device to remotely access the application service executing on the target computing device. Reception of the endpoint identifier and the particular access credentials may also cause the requesting device to store a record associating the label, the application service, and the particular access credentials.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
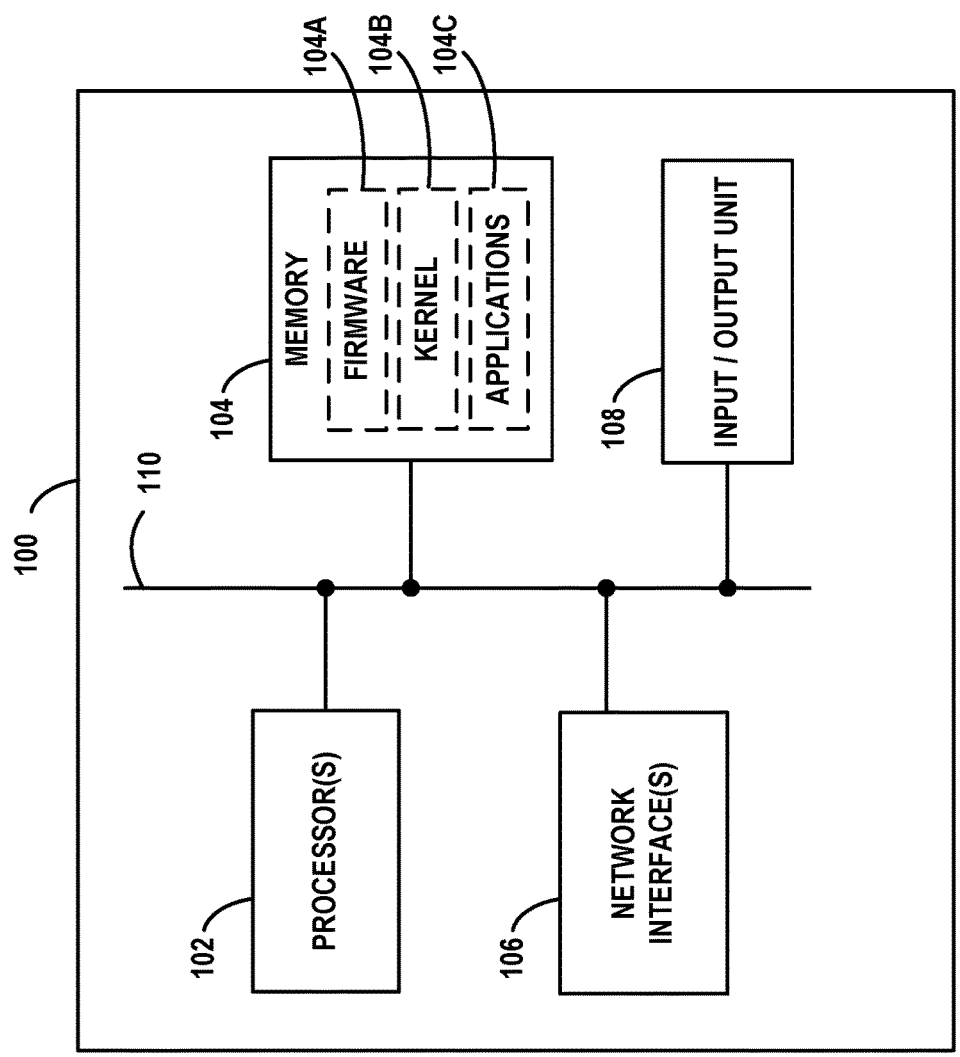
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its business, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations.

In this example, computing device 100 includes processor(s) 102 (referred to as "processor 102" for sake of simplicity), memory 104, network interface(s) 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be any type of computer processing unit, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be a single-core processor, and in other cases, processor 102 may be a multi-core processor with multiple independent processing units. Processor 102 may also include register memory for temporarily storing instructions being executed and related data, as well as cache memory for temporarily storing recently-used instructions and data.

Memory 104 may be any form of computer-usable memory, including but not limited to register memory and cache memory (which may be incorporated into processor 102), as well as random access memory (RAM), read-only memory (ROM), and non-volatile memory (e.g., flash memory, hard disk drives, solid state drives, compact discs (CDs), digital video discs (DVDs), and/or tape storage). Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more userspace software programs, such as web browsers or email clients, as well as any software libraries used by these programs.

Network interface(s) 106 may take the form of a wireline interface, such as Ethernet (e.g., Fast Ethernet, Gigabit Ethernet, and so on). Network interface(s) 106 may also support communication over non-Ethernet media, such as coaxial cables or power lines, or over wide-area media, such as Synchronous Optical Networking (SONET) or digital subscriber line (DSL) technologies. Network interface(s) 106 may also take the form of a wireless interface, such as IEEE 802.11 (Wifi), BLUETOOTH®, global positioning system (GPS), or a wide-area wireless interface. However, other forms of physical layer interfaces and other types of standard or proprietary communication protocols may be used over network interface(s) 106. Furthermore, network interface(s) 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
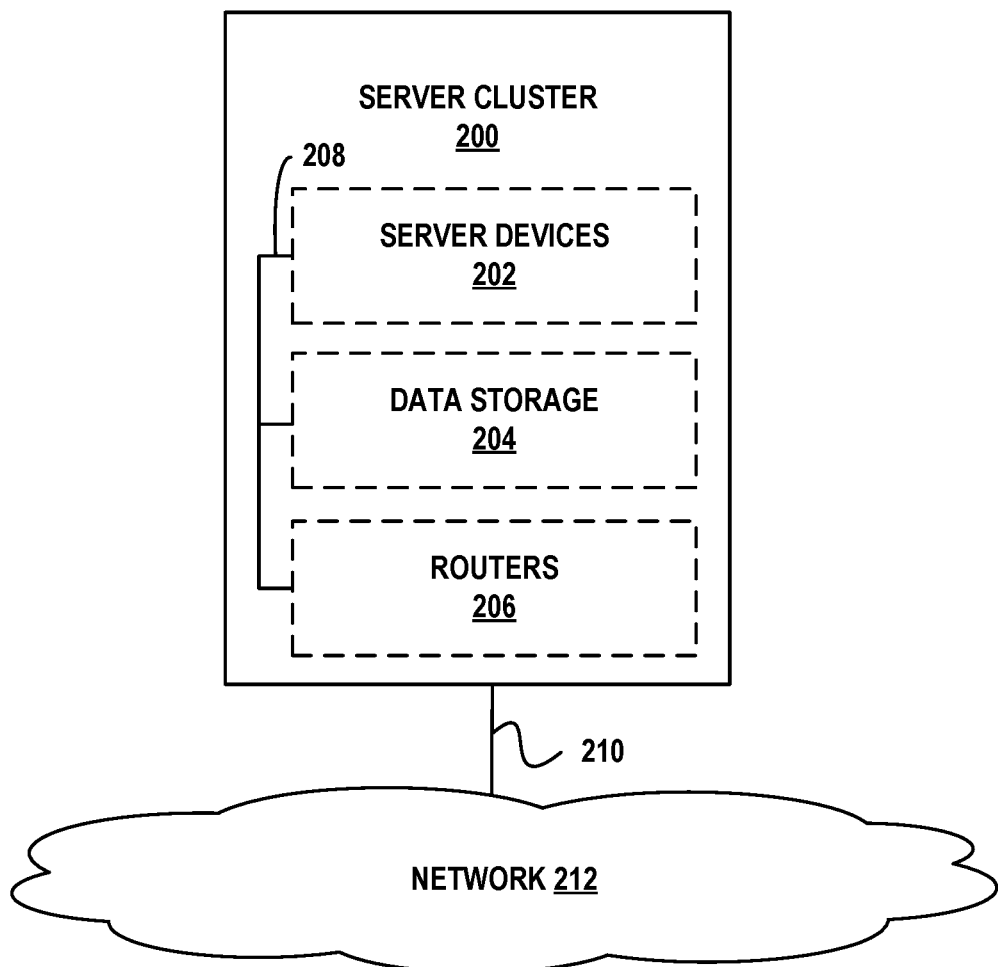
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
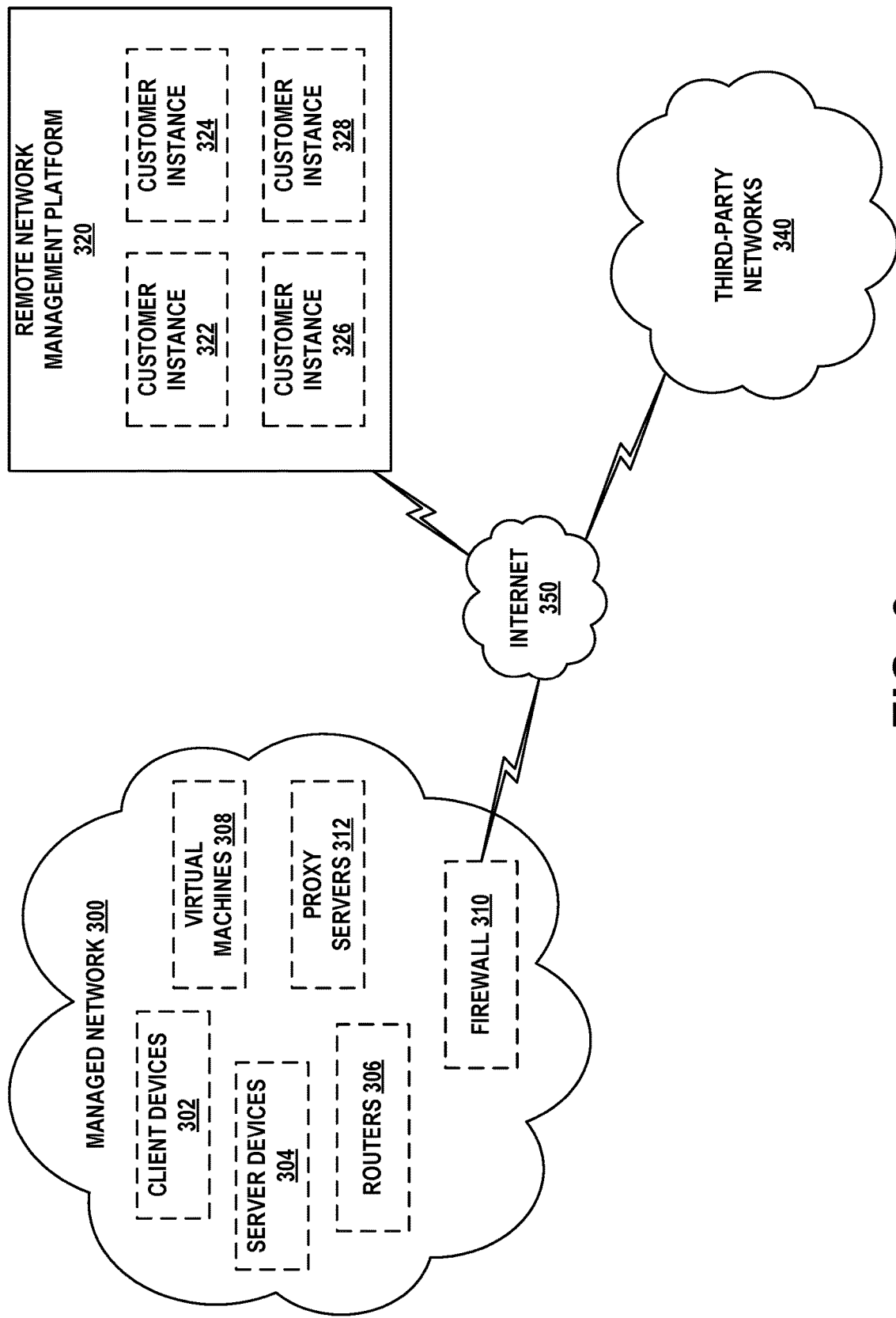
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by a business for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices and services therein, while allowing authorized communication that is initiated from managed network 300. Firewall 310 may also provide intrusion detection, web filtering, virus scanning, application-layer gateways, and other services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more customer instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four customer instances 322, 324, 326, and 328. Each of these instances may represent a set of web portals, services, and applications (e.g., a wholly-functioning aPaaS system) available to a particular customer. In some cases, a single customer may use multiple customer instances. For example, managed network 300 may be an enterprise customer of remote network management platform 320, and may use customer instances 322, 324, and 326. The reason for providing multiple instances to one customer is that the customer may wish to independently develop, test, and deploy its applications and services. Thus, customer instance 322 may be dedicated to application development related to managed network 300, customer instance 324 may be dedicated to testing these applications, and customer instance 326 may be dedicated to the live operation of tested applications and services.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database In contrast, the multi-instance architecture provides each customer with its own database in a dedicated computing instance. This prevents comingling of customer data, and allows each instance to be independently managed. For example, when one customer's instance experiences an outage due to errors or an upgrade, other customer instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple customer instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, customer instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
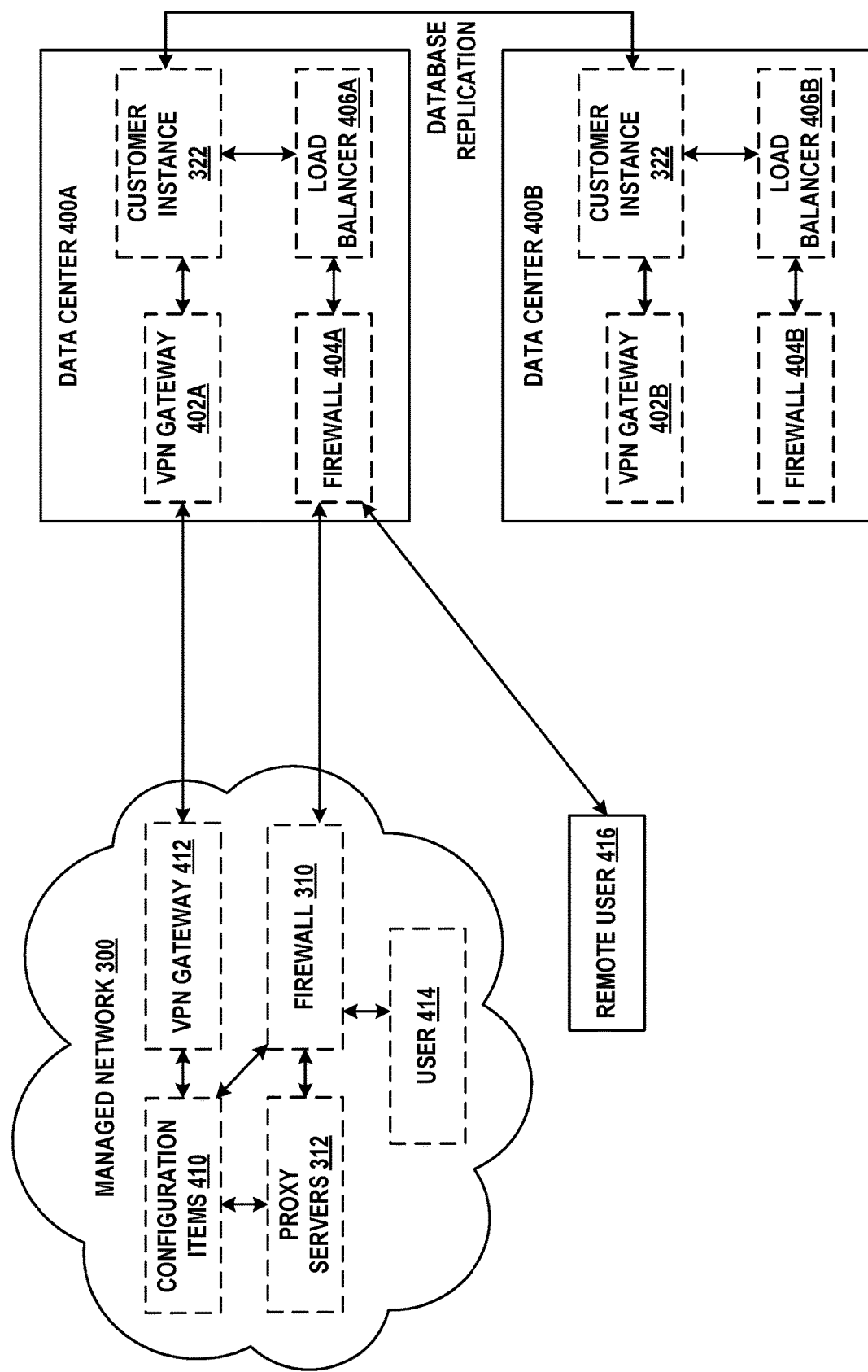
FIG. 4 depicts a communication environment involving a remote network management architecture, in accordance with example embodiments.

FIG. 4 further illustrates the communication environment between managed network 300 and customer instance 322, and introduces additional features and alternative embodiments. In FIG. 4, customer instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC). Firewall 404A may be configured to allow access from authorized users, such as user 414 and remote user 416, and to deny access to unauthorized users. By way of firewall 404A, these users may access customer instance 322, and possibly other customer instances. Load balancer 406A may be used to distribute traffic amongst one or more physical or virtual server devices that host customer instance 322. Load balancer 406A may simplify user access by hiding the internal configuration of data center 400A, (e.g., customer instance 322) from client devices. For instance, if customer instance 322 includes multiple physical or virtual computing devices that share access to multiple databases, load balancer 406A may distribute network traffic and processing tasks across these computing devices and databases so that no one computing device or database is significantly busier than the others. In some embodiments, customer instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, customer instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of customer instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of customer instance 322 with one or more Internet Protocol (IP) addresses of data center 400A may re-associate the domain name with one or more IP addresses of data center 400B. After this re-association completes (which may take less than one second or several seconds), users may access customer instance 322 by way of data center 400B.

FIG. 4 also illustrates a possible configuration of managed network 300. As noted above, proxy servers 312 and user 414 may access customer instance 322 through firewall 310. Proxy servers 312 may also access configuration items 410. In FIG. 4, configuration items 410 may refer to any or all of client devices 302, server devices 304, routers 306, and virtual machines 308, any applications, programs, or services executing thereon, as well as relationships between devices and services. Thus, the term "configuration items" may be shorthand for any physical or virtual device or service remotely discoverable or managed by customer instance 322, or relationships between discovered devices and services. Configuration items may be represented in a configuration management database (CMDB) of customer instance 322.

As noted above, VPN gateway 412 may provide a dedicated VPN to VPN gateway 402A. Such a VPN may be helpful when there is a significant amount of traffic between managed network 300 and customer instance 322, or security policies otherwise suggest or require use of a VPN between these sites. In some embodiments, any device in managed network 300 and/or customer instance 322 that directly communicates via the VPN is assigned a public IP address. Other devices in managed network 300 and/or customer instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device and Service Discovery

In order for remote network management platform 320 to administer the devices and services of managed network 300, remote network management platform 320 may first determine what devices are present in managed network 300, the configurations and operational statuses of these devices, and the services provided by the devices, and well as the relationships between discovered devices and services. As noted above, each device, service, and relationship may be referred to as a configuration item. The process of defining configuration items within managed network 300 is referred to as discovery, and may be facilitated at least in part by proxy servers 312.

For purpose of the embodiments herein, a "service" may refer to a process, thread, application, program, server, or any other software that executes on a device. A "service" may also refer to a high-level capability provided by multiple processes, threads, applications, programs, and/or servers on one or more devices working in conjunction with one another. For example, a high-level web service may involve multiple web application server threads executing on one device and accessing information from a database service that executes on another device. The distinction between different types or levels of services may depend upon the context in which they are presented.

Figure 5A:
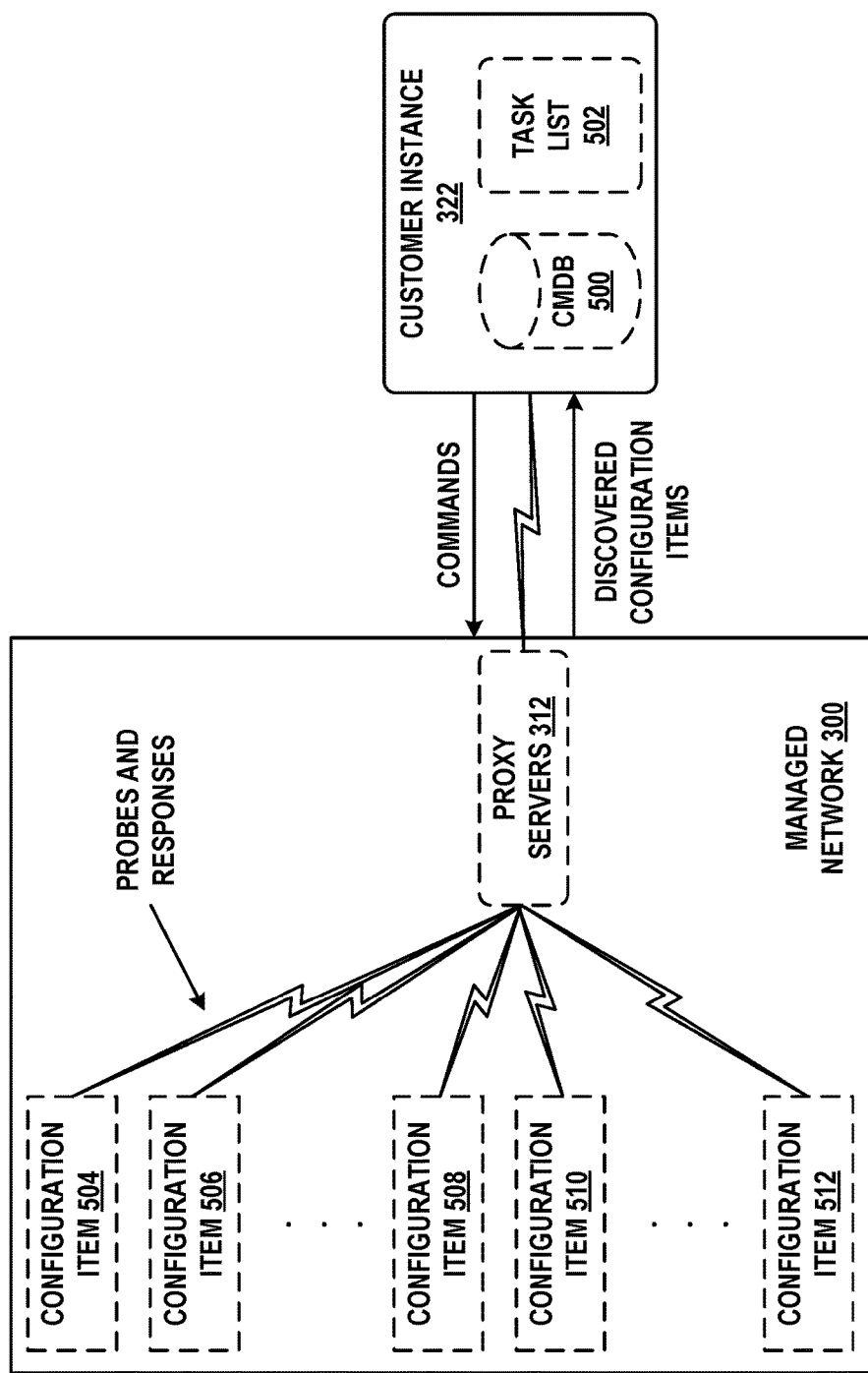
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within customer instance 322. Customer instance 322 may transmit discovery commands to proxy servers 312. In response, proxy servers 312 may transmit probes to various devices and services in managed network 300. These devices and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of customer instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, customer instance 322 may store this information in CMDB 500 and place tasks in task list 502 for discovery of devices at each of these addresses.

FIG. 5A also depicts devices and services in managed network 300 as configuration items 504, 506, 508, 510, and 512. As noted above, these configuration items represent a set of physical and/or virtual devices (e.g., client devices, server devices, routers, or virtual machines), services executing thereon (e.g., web servers, email servers, databases, or storage arrays), relationships therebetween, as well as higher-level services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, as a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (services), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device and service is available in CMDB 500. For example, after discovery, operating system version, hardware configuration and network configuration details for client devices, server devices, and routers in managed network 300, as well as services executing thereon, may be stored. This collected information may be presented to a user in various ways to allow the user to view the hardware composition and operational status of devices, as well as the characteristics of services.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
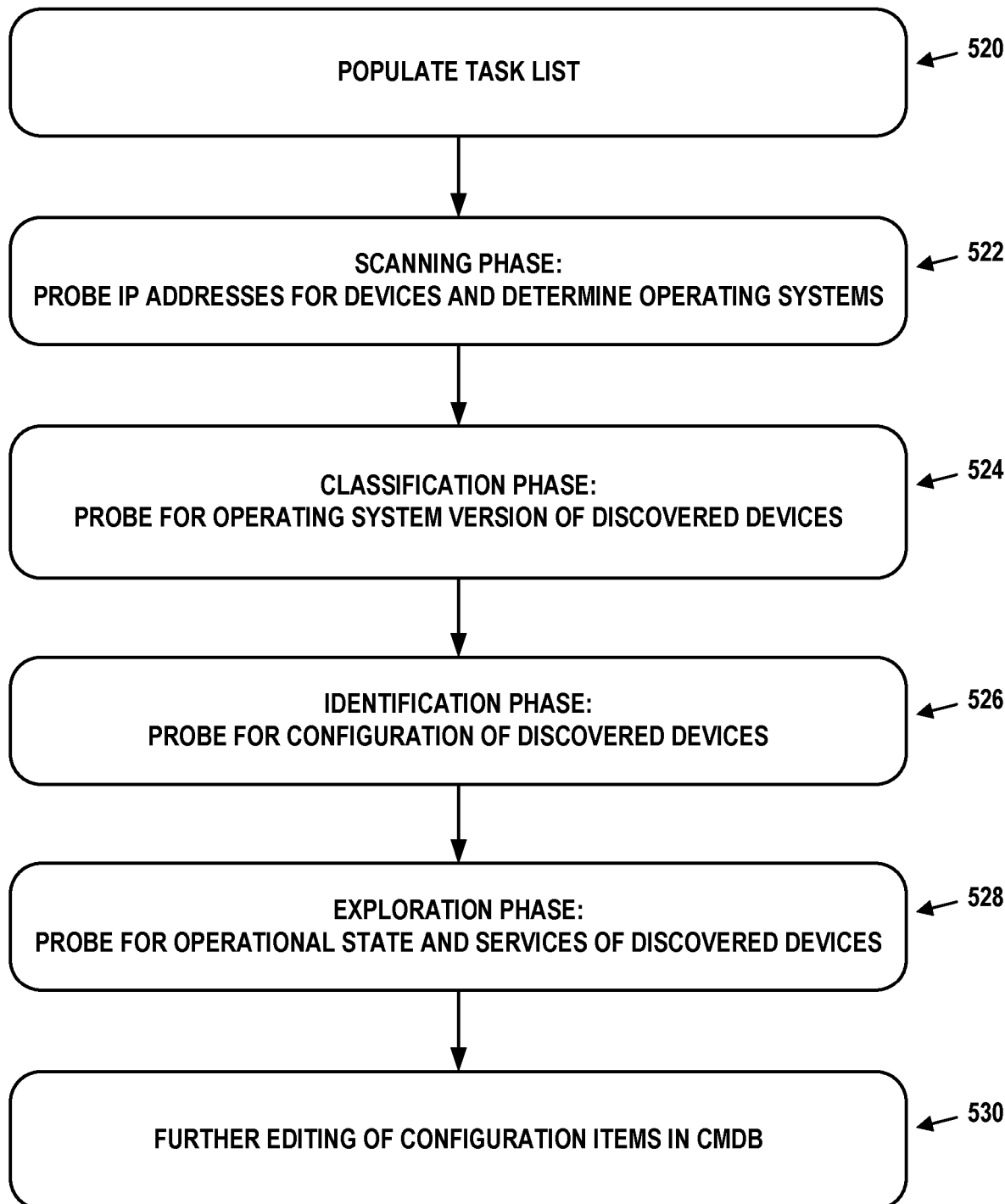
FIG. 5B is a flow chart, in accordance with example embodiments.

The discovery process is depicted as a flow chart in FIG. 5B. At block 520, the task list in the customer instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and services executing on the discovered devices. At block 530, further editing of the configuration items representing the discovered devices and services may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Example Types of Credentials

The embodiments herein involve storage and use of various types of credentials to access computing devices and services on managed networks, whether for purpose of discovery or other operations. Each credential type may refer to the content of the credential and/or how it is used. Some credentials are used with certain classes of computing devices and/or services. For instance, SSH credentials may include a userid and a password, and may be used to access computing devices executing a UNIX® operating system. Alternatively, SSH credentials may be considered to be associated with the SSH service in general.

The following examples of credentials may be kept within a credential store (see below). These examples, however, are not comprehensive, and other types of credentials are possible. Each of these examples may include a userid/password pair, a certificate, and/or any additional data described below.

Basic authentication credentials may be used during discovery or other procedures to access one or more computing devices on a managed network. Cloud-based services credentials may be used to access accounts on third-party networks. Examples of cloud-based services credentials include AMAZON WEB SERVICES® and MICROSOFT® Azure account information, such as access keys. JAVA® database connectivity (JDBC®) credentials may be used to access databases from JAVA® applications. Particularly, JDBC® defines a set of APIs through which such databases can be queried and updated. JAVA® message service (JMS) credentials may be used to send and receive messages between JAVA® applications. Particularly, JMS defines a set of roles for messaging participants and APIs through which the participants may communicate. SNMP credentials may be used to access networked devices, typically other than client devices and server devices. Thus, in some embodiments, routers and printers may offer SNMP interfaces for monitoring, configuration, and operational purposes. As noted above, SSH credentials may be used to remotely access certain types of computing devices (e.g., those executing a variation of the UNIX® operating system). In addition to a userid/password pair, SSH credentials may include a passphrase and a private key. WINDOWS® credentials may be used to remotely access computing devices that are executing the WINDOWS® operating system (e.g., by way of the POWERSHELL® application).

Any of the credential types above, or any other type of credential, may be stored in a table with additional fields. These additional fields may include a name for displaying to the user, an indication of whether the credential is active, a label that refers to a specific activity for which the credential is to be used, a priority of the credential amongst credentials of the same type, and whether the credential is stored externally (e.g., somewhere other than in a customer instance).

The label field may be used to identify credentials that should be used for a specific task. For instance, a computing device may have two sets of credentials associated with it: regular credentials and root credentials. Logging in to the computing device with the root credentials may be necessary if the computing device is to be rebooted, as the regular credentials might not be authorized to carry out this activity. Thus, the root credentials may be associated with a label of "root" so that they can be distinguished as such for higher-level tasks.

The priority field may be used to provide a relative ordering of credentials amongst other credentials of the same type. As one possible example, the priority field may be a number between 0 and 100, inclusive, with higher numbers representing higher priorities. For instance, if there are four different SSH credentials in the credential store, one may be assigned a priority of 100, another the priority of 90, and the final two a default priority of 0. In this arrangement, when an SSH credential is needed for access to a computing device, the credential with the priority of 100 may be tried first. If access fails with that credential, the credential with the priority of 90 may be tried. If access fails with that credential, the two credentials with priorities of 0 may tried in random order.

The external storage field may be populated with the address or identifier of a secure storage location of the credentials when those credentials are not located within the customer instance. For instance, some managed networks may maintain a secure storage location containing some or all of their credentials. Doing so may provide an extra layer of security, as the credentials are not stored in the customer instance except in a transitory fashion.

Regardless of its arrangement, the password fields, and perhaps the userid fields, may be encrypted in the credential store. For instance, computing devices on the customer instance may share an instance key that can be used to decrypt encrypted fields. The instance key may be used to decrypt encrypted data within a particular customer instance. In this manner, access to the credentials can be limited to individuals and devices with the appropriate authorization.

VI. Example Credential Acquisition

Figure 6A:
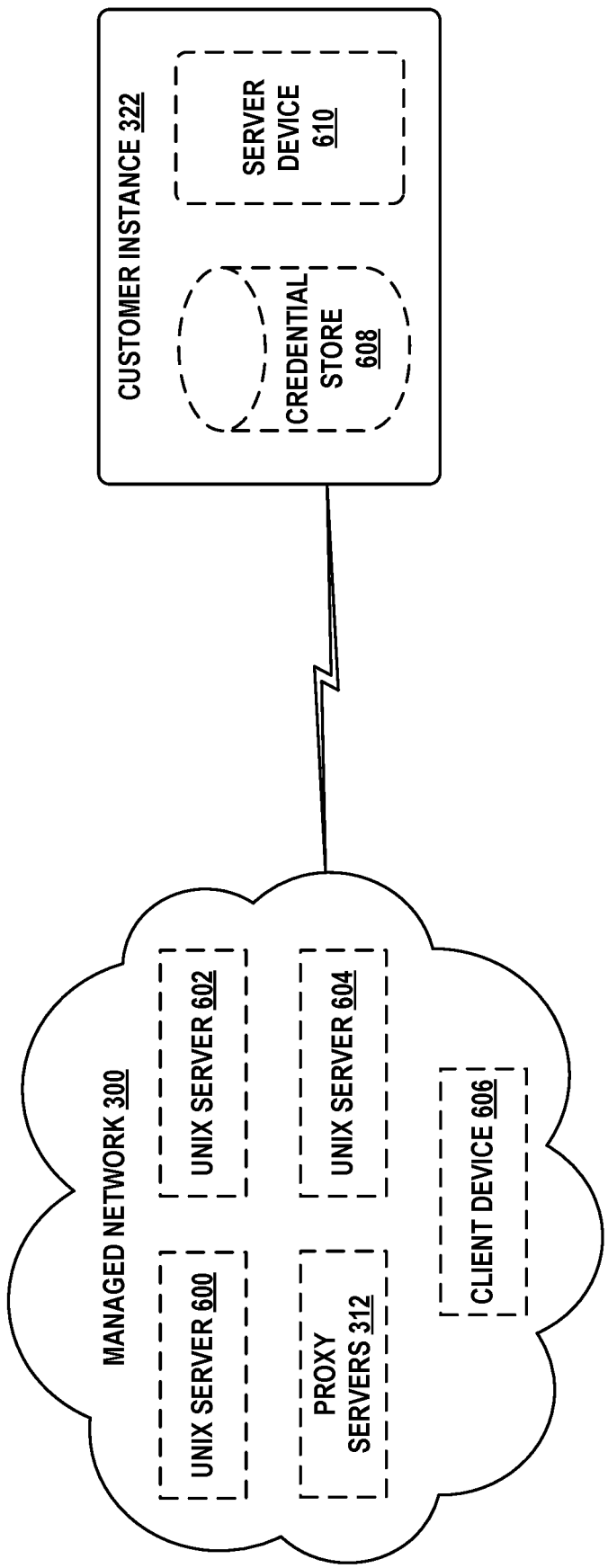
FIG. 6A depicts another communication environment involving a remote network management architecture, in accordance with example embodiments.

FIG. 6A depicts a logical arrangement of network components, not unlike that of FIG. 5A. Managed network 300 includes proxy servers 312, as well as UNIX® servers 600, 602, and 604, and client device 606. Customer instance 322 includes credential store 608 and server device 610. Other elements, such as firewalls and tasks lists, are omitted for purpose of simplicity.

UNIX® servers 600, 602, and 604 may be physical or virtual server devices that execute a variation of the UNIX® operating system. These devices may be remotely accessible by way of SSH. Client device 606 may be any type of computing device (e.g., a desktop or laptop computer) that a user operates to remotely manage UNIX® servers 600, 602, and 604.

Credential store 608 may be a database or another arrangement of information that includes one or more sets of credentials. In some embodiments, credential store 608 may be part of CMDB 500. As noted above, the credentials stored in credential store 608 may be encrypted. Some or all credentials for customer instance 322 may be placed in credential store 608. In this way, the credentials are in one place—possibly a single unified database table wherein each record refers to a specific credential.

Server device 610 may be a physical or virtual computing device that performs various operations within customer instance 322. For instance, server device 610 may include program logic that operates MVC applications. This logic may retrieve data from a CMDB (e.g., CMDB 500) and display representations of this data on a web-based GUI. In some cases, this GUI may represent UNIX® servers 600, 602, and 604, and through the GUI a user at client device 606 may be able to trigger operations that impact one or more of these server devices. Alternatively, server device 610 may automatically trigger such operations.

Figure 6B:
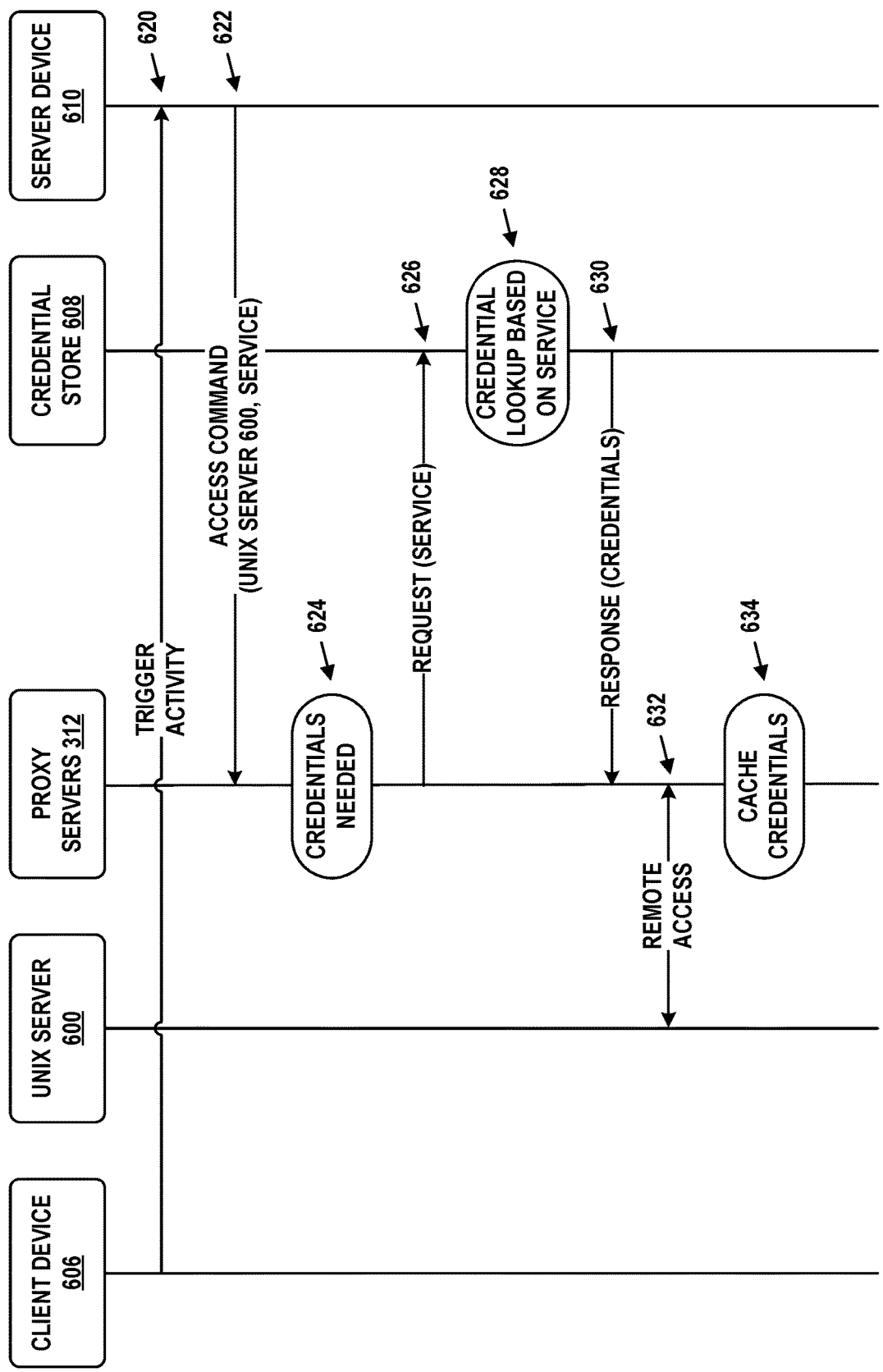
FIG. 6B depicts a message flow diagram, in accordance with example embodiments.

To that point, FIG. 6B illustrates an example operation, and in particular how credentials are used to support the operation. The operation involves client device 606 accessing a server device 610, and causing server device 610 to instruct proxy servers 312 to remotely access UNIX® server 600.

At step 620, client device 606 may trigger an activity on server device 610. For example, by way of a web-based GUI, the user of client device 606 may instruct server device 610 to reboot UNIX® server 600.

At step 622, server device 610 may transmit, to proxy servers 312, an access command containing an endpoint identifier of UNIX® server 600 (e.g., a domain name or IP address) and an indication of a service (e.g., SSH). This access command may instruct proxy servers 312 to cause a reboot of UNIX® server 600. The reboot may be caused by proxy servers 312 remotely logging on to UNIX® server 600 by way of SSH, and issuing a command line instruction to initiate the reboot. If special SSH credential credentials (e.g., root credentials) are needed to do so, and these credentials are associated with a label, the label may be included in the command.

After receiving the command, at step 624, proxy servers 312 may determine that credentials are needed to remotely access UNIX® server 600 so that the reboot can be carried out. For instance, proxy servers 312 may access a credential cache to determine whether SSH credentials for UNIX® server 600 are stored at proxy servers 312.

Assuming that this is not the case, at step 626, proxy servers 312 may transmit a request to credential store 608. This request may specify that SSH credentials are desired, and may include a label.

At step 628, credential store 608 may look up the requested credentials. If multiple SSH credentials are found and a label is not specified in the request, the SSH credentials with the highest priority may be selected. If a label is specified in the request, the SSH credentials associated with the label and having the highest priority may be selected. As noted above, if multiple credentials with the same priority fit the selection criteria, one of these credentials may be randomly selected.

At step 630, credential store 608 may transmit, to proxy servers 312, the selected credentials in a response. At step 632, proxy servers 312 may attempt to remotely access UNIX® server 600. If this remote access fails, proxy servers 312 may request, from credential store 608, another set of credentials fitting the selection criteria. In this fashion, multiple attempts to access UNIX® server 600 using different sets of credentials may take place until the proper set of credentials is found, or all credentials fitting the selection criteria are exhausted. Alternatively, the response of step 630 may include a list of credentials, and proxy servers 312 may iterate through this list attempting to access UNIX® server 600 with these credentials until either a set of credentials works or the list is exhausted.

As noted above, the remote access at step 632 may involve proxy servers 312 logging on to UNIX® server 600 by way of SSH and issuing a command line that causes UNIX® server 600 to reboot. However, the process illustrated in FIG. 6B may be used for other types of remote access activities.

At step 634, proxy servers 312 may cache the credentials that were successfully used to remotely access UNIX® server 600. These credentials may be temporarily stored in proxy servers 312 with a reference to an endpoint identifier (e.g., a domain name or IP address) of UNIX® server 600. When stored in this fashion, the credentials may be said to have an "affinity" to UNIX® server 600, and may be used in future remote accesses. Particularly, proxy servers 312 may be able to remotely access UNIX® server 600 (e.g., by way of SSH) without requesting credentials from credential store 608 as long as the credentials are cached.

Security of credentials used in this fashion may be facilitated by encryption. In some embodiments, computing devices within customer instance 322 may share an instance key that can be used to encrypt and/or decrypt fields in CMDB 500 or credential store 608. Thus, when credentials are entered into credential store 608 (e.g., by a user logged into server device 610 while operating client device 606), part or all of these credentials may be encrypted with the instance key. In this way, the credentials cannot be viewed by any entity that has access to credential store 608, but lacks the instance key.

When credentials are transmitted from credential store 608, such as at step 630, the instance key may be used to decrypt the credentials prior to transmission. Proxy servers 312 and credential store 608 may share a session key for securing credentials transmitted therebetween (in some cases, the session key may be used by some other component of customer instance 322, such as server device 610 or a load balancer that manages network traffic between managed network 300 and customer instance 322). In any event, part or all of the credentials may be re-encrypted with the session key then transmitted to proxy servers 312. In some variations, the credentials may first be encrypted with a public key of proxy servers 312, and then encrypted again with the session key. In these variations, proxy servers 312 first decrypt the credentials with the session key then once again with their private key. The private key and public key may be a cryptographic pair such that cryptographic transformations performed using one can be reversed by cryptographic transformations performed using the other.

Proxy servers 312 may also store the received credentials in an encrypted form, but can decrypt the credentials for use. Regardless of exactly how these transactions are carried out, proxy server devices in a managed network can securely obtain credentials to remotely access computing devices on the managed network. Such a capability facilitates a wide range of high-level services.

For instance, the discovery service described above may rely upon this secure obtaining of credentials. As an example, proxy servers 312 may seek to discover the configuration and operational characteristics of UNIX® server 600 (which is not known to be a UNIX® server until at least part of discovery takes place). Thus, during the classification phase, proxy servers 312 may use the obtained credentials to probe UNIX® server 600 to determine its operating system. Furthermore, during the identification phase, proxy servers 312 may use the obtained credentials to probe UNIX® server 600 to determine the hardware and networking configuration of UNIX® server 600. Additionally, during the exploration phase, proxy servers 312 may use the obtained credentials to probe UNIX® server 600 to determine, for example, applications, processes, and/or services executing on UNIX® server 600.

But the obtained credentials may be used for a wide variety of additional tasks. As noted above, these tasks may be referred to as "orchestrations," and may involve scripts or other program logic executing on a server device in customer instance 322 (e.g., server device 610), and carrying out activities. As one possible example, an orchestration may involve changing a common password on a set of LINUX® server devices. The common password may be an administrative or application password that is periodically changed (e.g., every 60, 90, or 120 days) in order to minimize risk in the event that the password becomes known to unauthorized parties. If the set contains more than a few server devices (e.g., if the set includes dozens of server devices), then manually changing the password on all of these server devices may be a time-consuming and error-prone task. However, by way of an orchestration script, the credentials for these server devices can be obtained by proxy servers 312, and proxy servers 312 can carry out these changes. Furthermore, the orchestration script can be configured to automatically run on a periodic basis or from time to time so that these security procedures do not need to be manually triggered.

Another possible orchestration example is the onboarding of new employees at an enterprise. When a new employee is hired, information about this employee may need to be entered into a number of computing systems in order for that employee to effectively carry out his or her job and be appropriately compensated. For instance, the employee may need to be set up with an enterprise network account for access to shared file systems, and an email account for communication. Further, the employee may need to be granted access to supply chain computing systems, as well as entered into finance and HR computing systems. Each of these activities may be carried out by different departments of the enterprise (e.g., IT, supply chain, finance, and HR, respectively). But with orchestration scripts executing in the customer instance, all of these activities may be triggered by entering the new employee's information in just one place.

Many other possible orchestrations exist. The embodiments herein are not limited to the examples provided above.

Despite the advantages provided by the embodiments described above, there are some drawbacks as well. As noted above, a managed network may simultaneously operate multiple customer instances at a remote network management platform. In some cases, one customer instance may be dedicated to application development, another customer instance may be dedicated to testing these applications, and yet another customer instance may be dedicated to the production operation of tested applications and services.

Each of these customer instances may use different sets of credentials for access to computing devices and services on the managed network. While the live operation instance may use the "true" credentials of computing devices and services in products on the managed network, the other instances may use different sets of credentials for purposes of application development and testing, and may also be developing and testing services executing on different computing devices (e.g., dedicated development or testbed environments).

Furthermore, even if credentials were shared between customer instances, the credentials in each instance are encrypted with that instance's instance key. Thus, in order to transfer credentials between instances, they would either exist in an unencrypted state for a period of time, or instance keys would be shared between instances. The former would reduce security and increase the risk that these credentials could be compromised. The latter would allow users with access to development and testing instances to be able to decrypt credentials used in the production environment, again reducing security and increasing the risk that these credentials could be compromised.

As a consequence, it is desirable to maintain different sets of credentials for each customer instance, and to not allow users only with access to particular instances be able to obtain credentials from another instance. Thus, the computing devices, services, and associated credentials that a particular orchestration uses may be different from customer instance to customer instance even when the same managed network is using each of these customer instances. This results in the credential store in a production instance possibly having to be updated each time a new computing device, service, or orchestration is deployed from the development instance or testing instance to the production instance. Furthermore, the program logic of the orchestration scripts may need to be modified to accommodate the change in computing devices and associated credentials. Thus, transitioning orchestrations from one instance to another can be a time consuming and error-prone process.

Moreover, a credential store may maintain multiple sets of credentials per service (e.g., 10 SSH credentials). Until an affinity is found between the service executing on a particular computing device and a particular set of credentials, multiple sets of credentials may be used in attempts to access the particular computing device. In some cases, this may cause the particular computing device to lock out one or more accounts from using the service, as unsuccessful access attempts may appear to be a hacking effort.

The solutions herein involve using labels to identify not only credentials, but logical endpoints as well. Such an endpoint may be an IP address or URL that uniquely identifies a particular computing device. Furthermore, an endpoint may be specified as a range of IP addresses (e.g., 10.10.10/8) when a number of computing devices on one or more subnets share the same credentials for specific services.

TABLE 1

| Name  | Label         | Endpoint         | Service | Userid   |
|-------|---------------|------------------|---------|----------|
| Cred1 | LINUX-ROOT    | 192.168.1.128/25 | SSH     | root     |
| Cred2 | LINUX-NONPRIV | 192.168.1.128/25 | SSH     | it-help  |
| Cred3 | LINUX-WEB     |                  | SSH     | webadmin |
| Cred4 | LINUX-SQL     |                  | SSH     | sqluser  |

TABLE 1-continued

| Name | Label | Endpoint | Service | Userid |
|---|---|---|---|---|
| Cred5 | WINDOWS-SHELL | 192.168.1.0/24 | WINDOWS | admin |
| Cred6 | JDBC-A | jdbc:mysql://example.com/db-a | JDBC | sql |
| Cred7 | JDBC-B | jdbc:mysql://example.com/db-b | JDBC | sql |

Table 1 illustrates some non-limiting examples of how these labels might be arranged. The data in Table 1 may be stored in a CMDB of a customer instance. Other instances may store tables with the same labels but different endpoints and credentials.

This solution address the problems described above. Notably, orchestrations can refer to labels rather than endpoints, and therefore do not need to change when transitioned between instances. Also, by including endpoints in the credential records, affinity is built into these records.

Table 1 assumes that the 192.168.1.0/24 subnet includes computing devices executing the WINDOWS® operating system, and the 192.168.1.128/25 range of this subnet includes computing devices executing the LINUX® operating system. Other types of computing devices may be present throughout the subnet.

The LINUX® devices may be configured with the following accounts: a root account with unlimited access, an it-help account with access limited to specific IT administration tasks (e.g., starting and stopping applications, as well as obtaining system status), a webadmin account with access limited to managing a web server, and an sqluser account with access limited to managing a database. The WINDOWS® devices may be configured with a POWERSHELL® account for remote access, which is referred to as the "WINDOWS" service. It is assumed that the LINUX® root, it-help, webadmin, and sqluser accounts, as well as the WINDOWS® POWERSHELL® account are possibly configured on multiple computing devices of the respective operating system type.

The managed network also includes two JDBC® services at respective URLs. These URLS may refer to different services executing on the same physical computing device, or to services executing on two different computing devices.

Table 1 includes several columns that define the context of each set of credentials. The name column is a user-defined name that may have no substantive impact on credential operations. However, it may serve to provide a convenient way for users to refer to different credentials.

The label column defines a label associated with each credential. As noted above, labels are not required. In order to use a label, the user may first associate the label with a set of credentials in the credential store, then use that label in an orchestration script. The orchestration script may use the credential associated with the label for any activities marked with the label.

The endpoint column defines the optional endpoint with which the credential is to be used. The format of the endpoint may be an IP address, URL, or any other type of endpoint identifier.

The service column defines the type of service, such as SSH, POWERSHELL® ("WINDOWS"), and JDBC®. Other services may be used.

The userid column defines the account name part of the credentials. Along with account names, credentials also may include passwords, which are not shown in Table 1.

Another column that may be present in Table 1 is an active column that defines whether the credentials are active. Inactive credentials are defined in the credential store but the credential store generally will not provide them in response to a request for credentials.

Figure 6C:
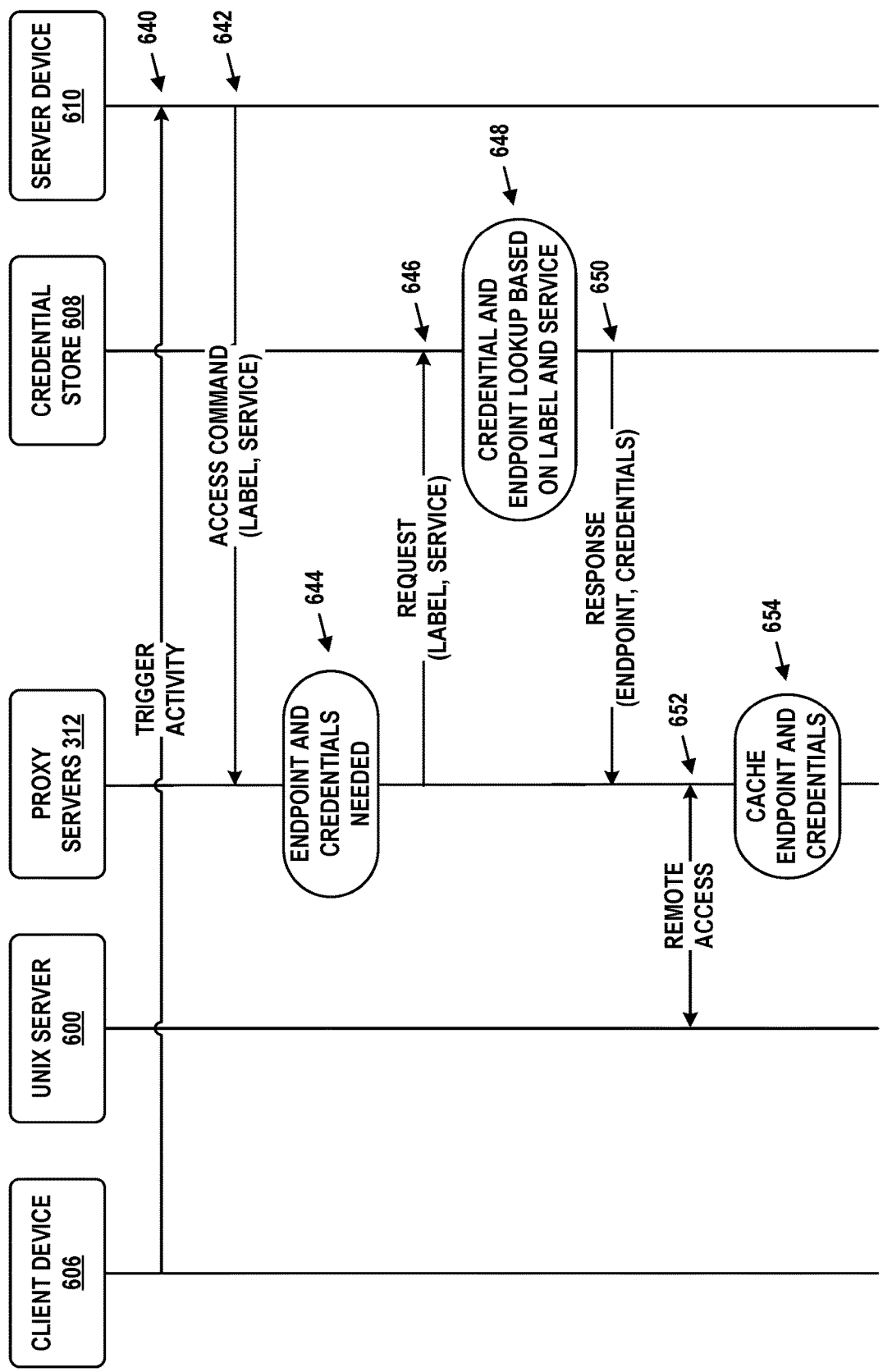
FIG. 6C depicts another message flow diagram, in accordance with example embodiments.

Use of the entries in such a credential store is illustrated in FIG. 6C. Particularly, FIG. 6C illustrates a similar transaction as that of FIG. 6B, except that a label is used.

At step 640, client device 606 may trigger an activity on server device 610. For example, the user of client device 606 may instruct server device 610 to remotely access UNIX® server 600. At step 642, server device 610 may transmit, to proxy servers 312, an access command containing a label and an indication of a service (e.g., SSH). Credential store 608 may have been preconfigured to associate the label with an endpoint identifier of UNIX® server 600 (e.g., a domain name or IP address).

After receiving the command, at step 644, proxy servers 312 may determine that the endpoint identifier and the credentials are needed to remotely access UNIX® server 600 so that the remote access can be carried out. For instance, proxy servers 312 may access a credential cache to determine whether an endpoint identifier and/or SSH credentials associated with the label are stored at proxy servers 312. In some embodiments, credentials might not be available, and only the endpoint identifier is provided.

Assuming that this is not the case, at step 646, proxy servers 312 may transmit a request to credential store 608. This request may specify the label and that the endpoint and its SSH credentials are desired.

At step 648, credential store 608 may look up the requested endpoint and credentials using the label. At step 650, credential store 608 may transmit, in a response to proxy servers 312, the endpoint identifier of the endpoint and the credentials. At step 652, proxy servers 312 may attempt to remotely access UNIX® server 600 by way of the endpoint identifier and credentials.

At step 654, proxy servers 312 may cache the endpoint and credentials that were successfully used to remotely access UNIX® server 600. Thus, proxy servers 312 may be able to remotely access UNIX® server 600 again without requesting the endpoint and credentials from credential store 608, for as long as the credentials are cached.

In embodiments in which an endpoint is not determined until runtime, the transaction of FIG. 6C may involve using a label to look up just credentials, rather than an endpoint and credentials. The transaction may be substantive similar to that of FIG. 6C, except that the endpoint is determined between steps 650 and 652.

Such an embodiment may take place during discovery. The label may refer to remotely accessing, by way of SSH, UNIX® server devices in general, and therefore might not identify a specific endpoint.

VII. Example Operations

Figure 7:
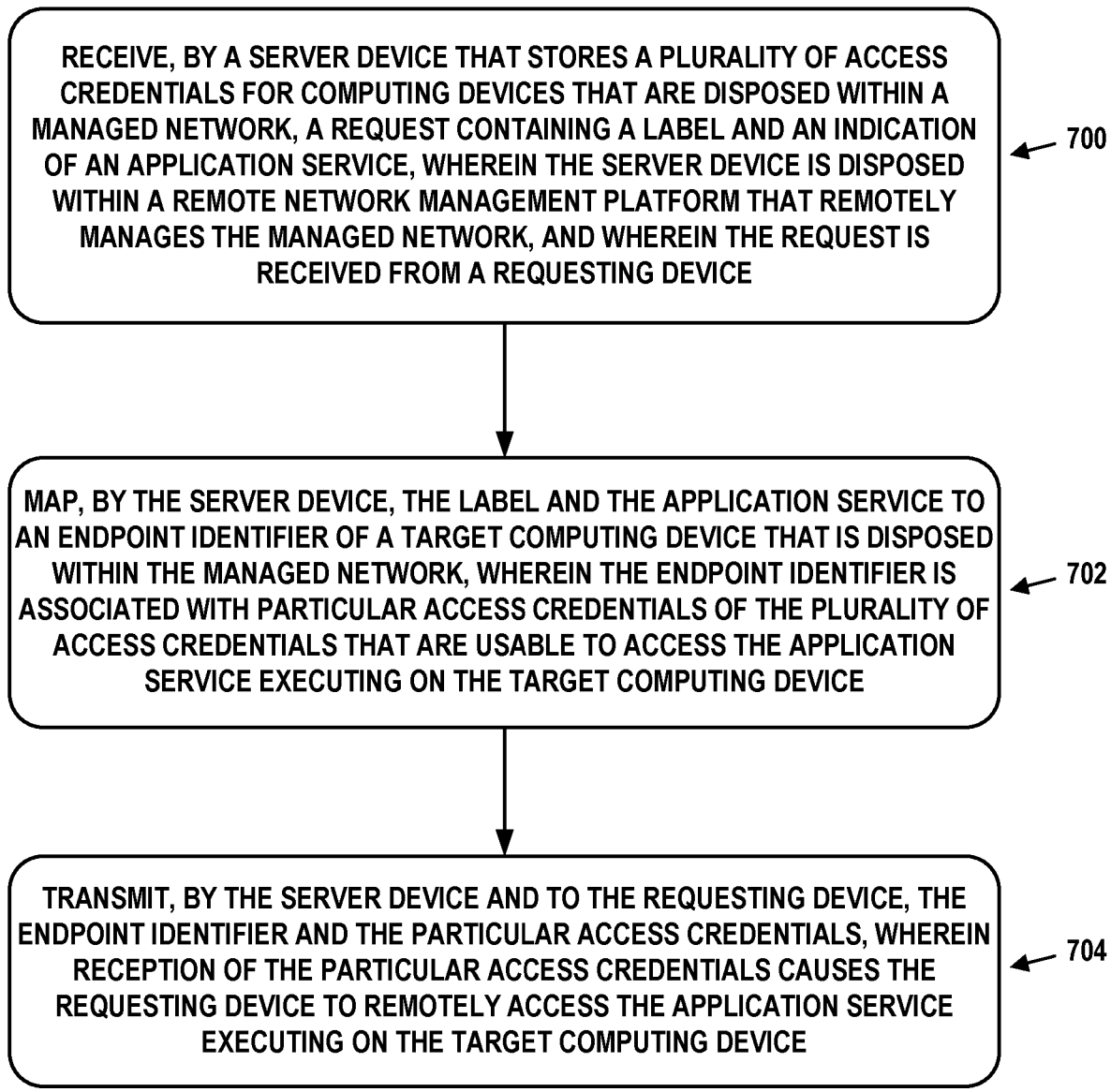
FIG. 7 is a flow chart, in accordance with example embodiments.

FIG. 7 is a flow chart illustrating an example embodiment. The process illustrated by FIG. 7 may be carried out by a computing device, such as computing device 100, and/or a cluster of computing devices, such as server cluster 200.

However, the process can be carried out by other types of devices or device subsystems. For example, the process could be carried out by a portable computer, such as a laptop or a tablet device.

The embodiments of FIG. 7 may be simplified by the removal of any one or more of the features shown therein. Further, these embodiments may be combined with features, aspects, and/or implementations of any of the previous figures or otherwise described herein.

Block 700 may involve receiving, by a server device that stores a plurality of access credentials for computing devices that are disposed within a managed network, a request containing a label and an indication of an application service. The server device may be disposed within a remote network management platform that remotely manages the managed network. The request may be received from a requesting device. The application service may be any type of service discussed above, or a different type of service used in a managed network.

Block 702 may involve mapping, by the server device, the label and the application service to an endpoint identifier of a target computing device that is disposed within the managed network. The endpoint identifier may be associated with particular access credentials of the plurality of access credentials, where the particular access credentials are usable to access the application service executing on the target computing device.

Block 704 may involve transmitting, by the server device and to the requesting device, the endpoint identifier and the particular access credentials. Reception of the endpoint identifier and the particular access credentials may cause the requesting device to remotely access the application service executing on the target computing device. For example, the requesting device may log in to the target computing device by way of the application service and gather information regarding the configuration and/or operational state of the target computing device and/or make changes to this configuration and/or operational state.

In some embodiments, the requesting device is a proxy server device that is disposed within the managed network. In some embodiments, the endpoint identifier is an IP address or URL. In some embodiments, the application service is a remote login service. In some embodiments, the server device stores, in a single database table, some or all access credentials that are managed by the remote network management platform on behalf of the managed network. Thus, the server device may be a dedicated credential store, or a CMDB that stores credentials.

In some embodiments, reception of the endpoint identifier and/or the particular access credentials may also cause the requesting device to store a record associating the label, the application service, and the particular access credentials.

In some embodiments, the particular access credentials include a userid and password usable to log on to the application service of the target computing device. The password may be stored, in the server device, in an encrypted manner. Transmitting the particular access credentials may involve decrypting the password with an instance key that is not available to the requesting device, encrypting the password with a session key that is shared between the server device and the requesting device, and transmitting the password as encrypted with the session key.

The server device may be a first server device that is part of a first computing instance that is disposed within the remote network management platform. The target computing device may be a first target computing device. The plurality of access credentials may be a first plurality of access credentials. The endpoint identifier may be a first endpoint identifier.

The process of FIG. 7 may further include receiving, by a second server device that stores a second plurality of access credentials for computing devices that are disposed within the managed network, a second request containing the label and the application service. The second server device may be part of a second computing instance that is disposed within the remote network management platform. Second particular access credentials of the second plurality of access credentials may be usable to access the application service executing on a second target computing device that is disposed within the managed network. The second request may be received from the requesting device;

The process of FIG. 7 may further include mapping, by the second server device, the label and the application service to a second endpoint identifier of the second target computing device. The second endpoint identifier may be associated with the second particular access credentials that are usable to access the application service executing on the second target computing device.

The process of FIG. 7 may further include transmitting, by the server device and to the requesting device, the second endpoint identifier and the second particular access credentials.

VIII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
a proxy server application executing on a proxy server device that is disposed within a managed network; and
a server device that is disposed within a remote network management platform that remotely manages the managed network, wherein the server device stores a plurality of access credentials for computing devices that are disposed within the managed network, and wherein the server device is configured to:
receive, from the proxy server application, a request containing a label and an indication of an application service,
map the label and the application service to an endpoint identifier of a target computing device that is disposed within the managed network, wherein the endpoint identifier is associated with particular access credentials of the plurality of access credentials that are usable to access the application service executing on the target computing device, and wherein the particular access credentials include a password usable to log on to the application service executing on the target computing device, and
transmit, to the proxy server application, the endpoint identifier and the particular access credentials, wherein reception of the endpoint identifier and the particular access credentials causes the proxy server application to remotely access the application service executing on the target computing device, and wherein transmitting the particular access credentials comprises:
decrypting the password with an instance key that is not available to the proxy server application;
encrypting the password with a session key that is shared between the server device and the proxy server application; and
transmitting the password as encrypted with the session key.

2. The system of claim 1, wherein the endpoint identifier is an IP address or uniform resource locator.

3. The system of claim 1, wherein reception of the endpoint identifier and the particular access credentials also causes the proxy server application to store a record associating the label, the application service, and the particular access credentials.

4. The system of claim 1, wherein the application service is a remote login service.

5. The system of claim 1, wherein the server device is a first server device that is part of a first computing instance that is disposed within the remote network management platform, wherein the target computing device is a first target computing device, wherein the endpoint identifier is a first endpoint identifier, and wherein the plurality of access credentials are a first plurality of access credentials, the system further comprising:
a second server device that stores a second plurality of access credentials for computing devices that are disposed within the managed network, wherein the second server device is part of a second computing instance that is disposed within the remote network management platform, wherein the second computing instance is logically isolated from the first computing instance, and wherein the second server device is configured to:
receive, from the proxy server application, a second request containing the label and the indication of the application service,
map the label and the application service to a second endpoint identifier of a second target computing device that is disposed within the managed network, wherein second particular access credentials of the second plurality of access credentials are usable to access the application service executing on the second target computing device, and
transmit, to the proxy server application, the second endpoint identifier and the second particular access credentials.

6. The system of claim 1, wherein the particular access credentials include a userid usable to log on to the application service executing on the target computing device.

7. The system of claim 1, wherein the password is stored, in the server device, in an encrypted manner.

8. The system of claim 1, wherein the server device stores, in a single database table, all access credentials that are managed by the remote network management platform on behalf of the managed network.

9. A method comprising:
receiving, by a server device that stores a plurality of access credentials for computing devices that are disposed within a managed network, a request containing a label and an indication of an application service, wherein the server device is disposed within a remote network management platform that remotely manages the managed network, and wherein the request is received from a requesting device;

mapping, by the server device, the label and the application service to an endpoint identifier of a target computing device that is disposed within the managed network, wherein the endpoint identifier is associated with particular access credentials of the plurality of access credentials that are usable to access the application service executing on the target computing device, and wherein the particular access credentials include a password usable to log on to the application service executing on the target computing device; and transmitting, by the server device and to the requesting device, the endpoint identifier and the particular access credentials, wherein reception of the endpoint identifier and the particular access credentials causes the requesting device to remotely access the application service executing on the target computing device, and wherein transmitting the particular access credentials comprises:

decrypting the password with an instance key that is not available to the proxy server application;

encrypting the password with a session key that is shared between the server device and the proxy server application; and transmitting the password as encrypted with the session key.

10. The method of claim 9, wherein the requesting device is a proxy server device that is disposed within the managed network.

11. The method of claim 9, wherein the endpoint identifier is an IP address or uniform resource locator.

12. The method of claim 9, wherein reception of the endpoint identifier and the particular access credentials also causes the requesting device to store a record associating the label, the application service, and the particular access credentials.

13. The method of claim 9, wherein the application service is a remote login service.

14. The method of claim 9, wherein the server device is a first server device that is part of a first computing instance that is disposed within the remote network management platform, wherein the target computing device is a first target computing device, wherein the endpoint identifier is a first endpoint identifier, and wherein the plurality of access credentials are a first plurality of access credentials, the method further comprising:

receiving, by a second server device that stores a second plurality of access credentials for computing devices that are disposed within the managed network, a second request containing the label and the application service, wherein the second server device is part of a second computing instance that is disposed within the remote network management platform, wherein second particular access credentials of the second plurality of access credentials are usable to access the application service executing on a second target computing device that is disposed within the managed network, and wherein the second request is received from the requesting device;

mapping, by the second server device, the label and the application service to a second endpoint identifier of the second target computing device, wherein the second endpoint identifier is associated with the second particular access credentials that are usable to access the application service executing on the second target computing device; and transmitting, by the server device and to the requesting device, the second endpoint identifier and the second particular access credentials.

15. The method of claim 9, wherein the particular access credentials include a userid usable to log on to the application service of the target computing device.

16. The method of claim 9, wherein the password is stored, in the server device, in an encrypted manner.

17. The method of claim 9, wherein the server device stores, in a single database table, all access credentials that are managed by the remote network management platform on behalf of the managed network.

18. An article of manufacture including a non-transitory computer-readable medium, having stored thereon program instructions that, upon execution by a server computing system that is disposed within a remote network management platform that remotely manages a managed network, cause the server computing system to perform operations comprising:

receiving, from a proxy server application executing on a proxy server device that is disposed within the managed network, a request containing a label and an indication of an application service;

mapping the label and the application service to an endpoint identifier of a target computing device that is disposed within the managed network, wherein the endpoint identifier is associated with particular access credentials of a plurality of access credentials that are usable to access the application service executing on the target computing device, and wherein the particular access credentials include a password usable to log on to the application service executing on the target computing device; and transmitting, to the proxy server application, the endpoint identifier and the particular access credentials, wherein reception of the endpoint identifier and the particular access credentials causes the proxy server application to remotely access the application service executing on the target computing device, and wherein transmitting the particular access credentials comprises:

decrypting the password with an instance key that is not available to the proxy server application;

encrypting the password with a session key that is shared between the server device and the proxy server application; and transmitting the password as encrypted with the session key.

* * * * *